United States Patent
Sahu et al.

(10) Patent No.: US 9,903,767 B2
(45) Date of Patent: *Feb. 27, 2018

(54) WIRELESS THERMIONIC SENSOR

(71) Applicant: Palo Alto Research Center Incorporated, Palo Alto, CA (US)

(72) Inventors: Saroj Kumar Sahu, Fremont, CA (US); Scott Limb, Palo Alto, CA (US); Francisco E. Torres, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 409 days.

This patent is subject to a terminal disclaimer.

(21) Appl. No.: 14/575,628

(22) Filed: Dec. 18, 2014

(65) Prior Publication Data

US 2016/0178452 A1 Jun. 23, 2016

(51) Int. Cl.
*G01K 7/40* (2006.01)
*G01L 21/32* (2006.01)
*G01K 11/00* (2006.01)
*G01L 1/14* (2006.01)

(52) U.S. Cl.
CPC .............. *G01K 7/40* (2013.01); *G01K 11/00* (2013.01); *G01L 1/14* (2013.01); *G01L 21/32* (2013.01)

(58) Field of Classification Search
CPC .. G01K 7/40; G01K 11/00; G01L 1/14; G01L 21/32
See application file for complete search history.

(56) References Cited

U.S. PATENT DOCUMENTS

| | | | | |
|---|---|---|---|---|
| 1,978,918 A | * | 10/1934 | Terman | H01J 21/20 313/261 |
| 3,212,336 A | | 10/1965 | Smith | |
| 3,257,848 A | * | 6/1966 | Crosby, Jr. | G01K 1/022 313/310 |
| 4,138,622 A | * | 2/1979 | McCormick | H01J 1/20 313/250 |
| 4,296,356 A | * | 10/1981 | Beinitz | H01J 41/00 315/107 |

(Continued)

FOREIGN PATENT DOCUMENTS

| EP | 2375438 A1 | 10/2011 |
|---|---|---|
| GB | 353875 A | 7/1931 |
| RU | 2030718 C1 | 3/1995 |

OTHER PUBLICATIONS

Extended European Search Report for EP 15198236, dated Apr. 15, 2016.

*Primary Examiner* — Lisa Caputo
*Assistant Examiner* — Philip Cotey
(74) *Attorney, Agent, or Firm* — Palo Alto Research Center Incorporated

(57) ABSTRACT

A thermionic sensor is disclosed. The sensor includes a sensor housing at least partially defining an emission chamber in which at least a partial vacuum is maintained; a cathode disposed in the emission chamber; an anode disposed in the emission chamber and spaced apart from the cathode; and an electrically conductive layer disposed in the emission chamber facing the anode and cathode. The thermionic sensor is configured to output a detection signal when the anode and cathode are at substantially the same temperature.

19 Claims, 15 Drawing Sheets

(56) References Cited

U.S. PATENT DOCUMENTS

| | | | | |
|---|---|---|---|---|
| 4,368,416 A | * | 1/1983 | James | H02N 3/00 |
| | | | | 136/205 |
| 6,089,311 A | * | 7/2000 | Edelson | F25B 21/00 |
| | | | | 165/104.23 |
| 2004/0189141 A1 | * | 9/2004 | Tavkhelidze | F25B 21/00 |
| | | | | 310/306 |
| 2011/0128010 A1 | * | 6/2011 | Gianchandani | G01L 9/0072 |
| | | | | 324/460 |
| 2015/0206725 A1 | * | 7/2015 | Adriani | H01J 45/00 |
| | | | | 310/306 |

* cited by examiner

WIRELESS THERMIONIC SENSOR

TECHNICAL FIELD

The present disclosure relates to thermionic sensors and methods of using the same.

BACKGROUND

Extreme environments pose a challenge to sensors configured to monitor a parameter in its surrounding environment. For instance, high temperature environments, high pressure environments, and/or environments containing corrosive gases all pose challenges for designing a sensor capable of sustained operation in such extreme environments. In view of these challenges, use of conventional sensors is either not viable in such environments, or requires modification such as a large and cumbersome size, e.g. due to one or more surrounding layers to protect the sensor from the surrounding extreme environment. For example, conventional sensors for use at high temperature are often designed to mitigate the effects of high temperature upon the sensors, such as by minimizing the flow of heat from the surrounding high temperature environment to the sensor.

Thermionic emission is a phenomenon in which heat induces the generation and flow of electrons from a metal surface. The flow of electrons occurs when the thermal energy of an electron is greater than the binding force of the electron to the metal (i.e., the thermal energy exceeds the work function of the metal). Thermionic emission, as a phenomenon, has been utilized in conventional devices, such as in vacuum tubes, where released electrons are collected on a positively charged anode. For example, some conventional devices include a heating coil to heat a metal surface to a sufficient temperature for thermionic emission to occur. For instance, the cathode is heated up with an external power source, but the anode is not. The enclosure remains in normal low temperature ambient conditions.

It would thus be useful to provide a sensor that can take advantage of the surrounding environment to facilitate its function, which would be capable of sensing a wide range of relevant process conditions, such as, for example, temperature, pressure, strain, flux, or flow rate. By providing a sensor for sustained use in an extreme environment, enhanced monitoring and control may be provided for systems subject to the extreme environment.

SUMMARY

According to various exemplary embodiments of the disclosure, a thermionic sensor comprising a sensor housing at least partially defining an emission chamber in which vacuum conditions are maintained; a cathode disposed in the emission chamber; an anode disposed in the emission chamber and spaced apart from the cathode; and an electrically conductive layer disposed in the emission chamber facing the anode and cathode is provided. The thermionic sensor is configured to output a detection signal when the anode and cathode are at substantially the same temperature.

According to further exemplary embodiments, a sensor package comprising a substrate; a package housing disposed on the substrate and at least partially defining a package chamber in which vacuum conditions are maintained; a thermionic sensor disposed in the package chamber; and a first wireless transmission device disposed on the substrate and configured to wirelessly transmit the sensor signal to an external device, is also provided.

According to still further exemplary embodiments, a method of using a thermionic sensor package, the method comprising exposing the sensor package to a high-temperature environment, such that an anode and a cathode of a sensor of the sensor package are both heated to at least about 600° C.; generating a sensor signal using thermionic emission between the cathode and the anode; and transmitting the sensor signal wirelessly to an external device, is also provided.

As described, sensors according to various exemplary embodiments described herein use heat from a high temperature environment to naturally enable thermionic emission, which is in turn used to measure one or more parameters of the surrounding environment. The sensor may be used to sense a wide range of relevant process conditions, such as, for example, temperature, pressure, strain, flux, or flow rate. By providing a sensor for sustained use in an extreme environment, enhanced monitoring and control is provided for systems subject to the extreme environment Additional objects, features, and/or advantages will be set forth in part in the description which follows, and in part will be obvious from the description, or may be learned by practice of the present disclosure and/or claims. At least some of these objects and advantages may be realized and attained by the elements and combinations particularly pointed out in the appended claims, although such is not necessary to be within the scope of the disclosure and claims.

It is to be understood that both the foregoing general description and the following detailed description are exemplary and explanatory only and are not restrictive of the claims; rather the claims should be entitled to their full breadth of scope, including equivalents.

BRIEF DESCRIPTION OF THE DRAWINGS

The present disclosure can be understood from the following detailed description, either alone or together with the accompanying drawings. The drawings are included to provide a further understanding of the present disclosure, and are incorporated in and constitute a part of this specification. The drawings illustrate one or more exemplary embodiments of the present disclosure and together with the description serve to explain certain principles and operation.

DETAILED DESCRIPTION

Exemplary embodiments described herein relate to a wireless thermionic sensor capable of sustained use in an extreme environment. For instance, sensors according to the exemplary embodiments described herein may be used at high temperature, such as, for example, up to about 1800° C., such as about 750° C. to about 1600° C. or about 1000° C. to about 1500° C.; high pressure, such as pressures up to about 1250 psi, for example up to about 1000 psi or up to about 750 psi; and/or gaseous environments including, such as, for example, hydrocarbon, oxygen, water vapor, carbon dioxide, carbon monoxide, sulfur oxide, and/or nitrous oxide gases, wherein the gaseous environment may provide a flow rate of up to about 1750 mph, such as up to about 1500 mph or up to about 1250 mph.

According to one embodiment, an exemplary thermionic sensor includes at least one thermionic element in a package capable of measuring at least one environmental parameter. The sensor may be a temperature sensor, pressure sensor, a strain sensor, a flux sensor, a flow rate sensor, and/or a sensor to measure one or more other parameters. According to one exemplary embodiment, the sensor may optionally include one or more amplifiers to enhance an output signal of the sensor. The sensor may optionally be wireless, according to at least one exemplary embodiment, although in at least one embodiment the sensor is not wireless. The sensor may include a thermionic power generator, according to one exemplary embodiment. The sensor may include a getter material to substantially maintain a vacuum or partial vacuum within the sensor, according to at least one exemplary embodiment.

Figure 1:
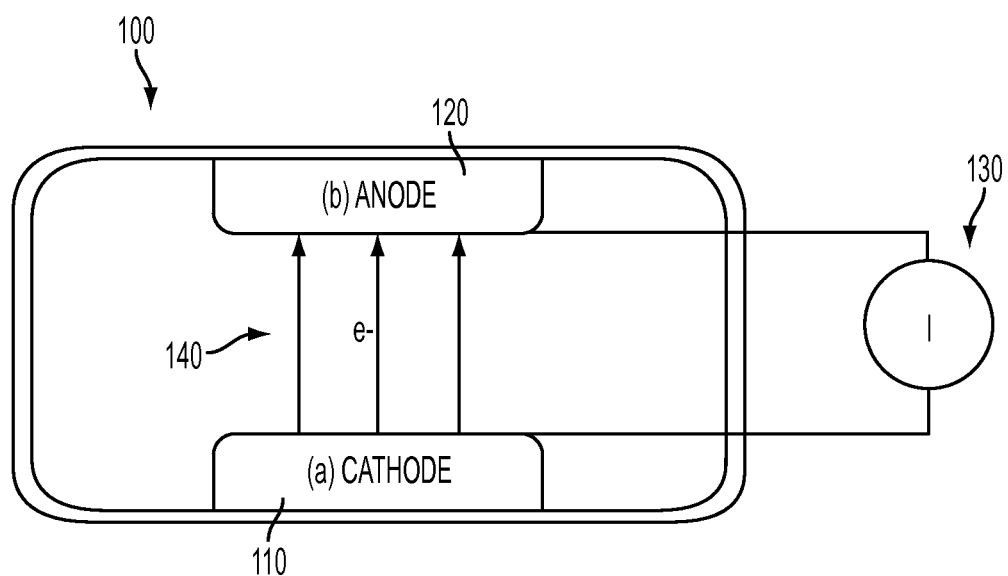
FIG. 1 shows a side cross-sectional view of a thermionic element, according to various embodiments of the present disclosure.

FIG. 1 is a schematic diagram of a thermionic element 100 according to an exemplary embodiment of the present disclosure. Referring to FIG. 1, the thermionic element 100 includes a cathode 110 and an anode 120. Herein, a cathode may also be referred to as an "emission electrode" or "electron emitter", and an anode may be referred to as a "collection electrode" or "electron collector". When thermionic element 100 is heated to a sufficient temperature to induce thermionic emission, electrons 140 are emitted from the cathode 110 to the anode 120. A voltage source 130 may be provided to induce a small bias voltage, such as, for example, about 5 V, between the cathode 110 and anode 120, to assist the flow of electrons from the cathode 110 to the anode 120. The magnitude of the current between the cathode 110 and the anode 120 is directly related to the temperatures of the cathode 110 and anode 120, and the geometry of the device. Due to this relationship, a relatively simple but effective temperature sensor may be provided by including the thermionic element 100 and measuring the current between the cathode 110 and anode 120. Other conditions may be measured using the thermionic element 100, such as by modulating the flow of current between the cathode 110 and anode 120 with a process condition to be measured, as will be discussed in additional exemplary embodiments described below. Further, a thermionic element 100 may be used in other components, which will be discussed in further detail below.

Figure 2:
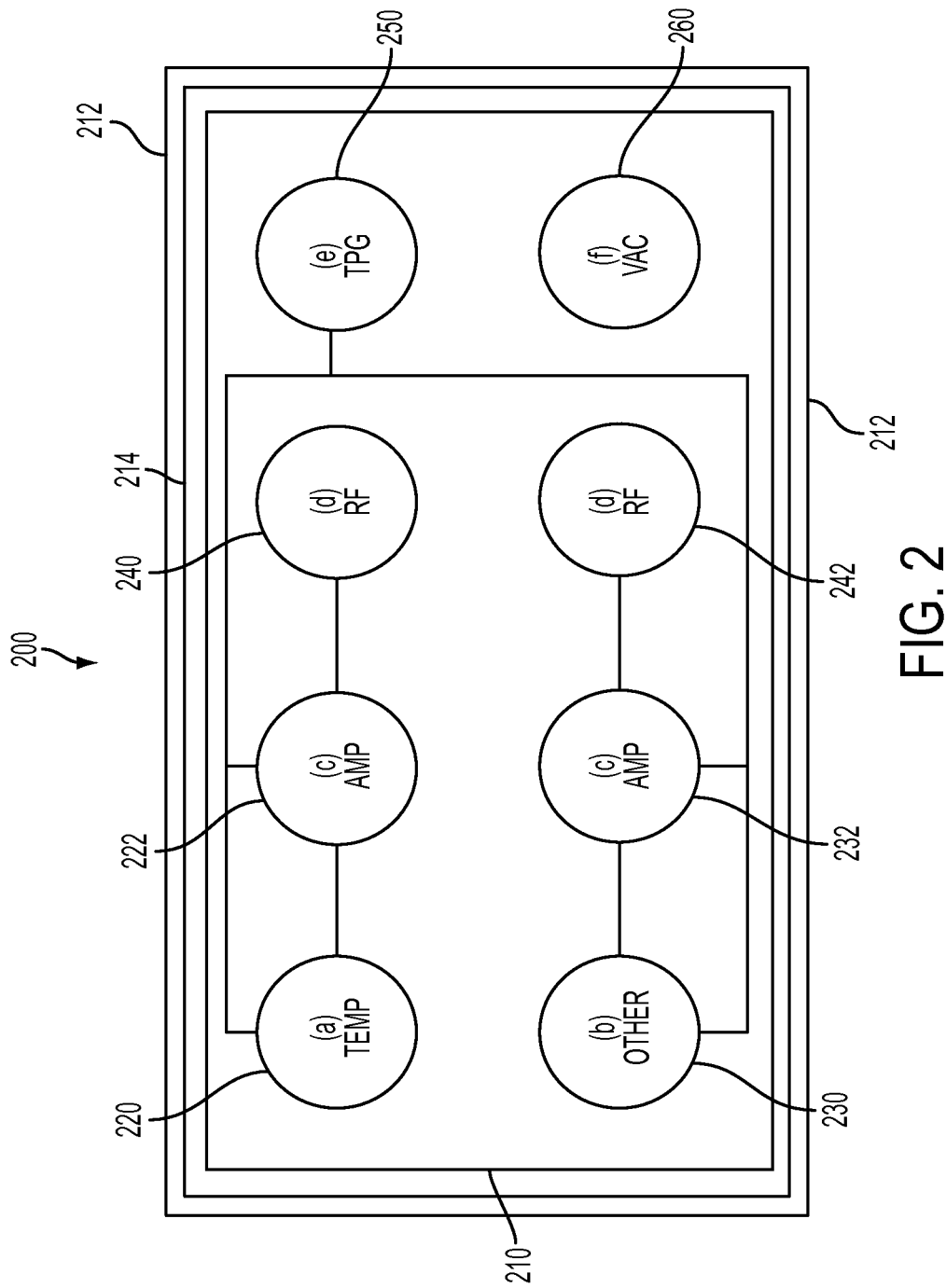
FIG. 2 shows a side cross-sectional view of a thermionic sensor package, according to various embodiments of the present disclosure.

FIG. 2 illustrates a sensor package 200, according to an exemplary embodiment of the disclosure. Referring to FIG. 2, sensor package 200 includes a substrate 214, a housing 210 disposed on substrate 214, and an encasement 212 that surrounds housing 210. Herein, housing 210 may be referred to as a "package housing". Within housing 210, sensor package 200 includes a sensor 220; a sensor 230; amplifiers 222, 232; wireless transmission devices 240, 242; a scavenging material 260; and a power device 250 (power source). However, according to at least certain exemplary embodiments, one or more of these elements may optionally be omitted, as discussed below.

Sensor 220 may be configured to measure the ambient temperature of the sensor package 200, and may be referred to as a temperature sensor. Sensor 230 may be configured to measure the ambient pressure of sensor package 200, and may be referred to as a pressure sensor. However, according to various embodiments, sensors 220 and 230 may be other types of sensors. Temperature sensor 220 and pressure sensor 230 may be based upon the schematic thermionic element 100 of FIG. 1, for example.

In contrast to other sensor devices, sensor package 200 may optionally be wireless. For instance, sensor package 200 may lack a power connection to an external power source or transmitter, and may lack a vacuum connection to an external vacuum source to maintain a vacuum or partial vacuum within the interior of sensor package 200. According to at least one exemplary embodiment, an outer surface of sensor package 200 may be continuous. For instance, the outer surface may be hermetically sealed without any apertures, connections, or passages extending through the housing of sensor package 200, from between an exterior of sensor package 200 and an interior of sensor package 200, and to any devices or components not directly attached to sensor package 200. According to some embodiments, power device 250 may be attached to the outer surface of the sensor package 200. However, sensor package 200 may lack a connection to any external power source, such that sensor package 200 is self-contained.

Wireless transmission devices 240, 242 respectively transmit signals output by sensors 220, 230 to one or more external devices. For example, a signal may be transmitted to an external control system that controls a parameter corresponding to the output signal. Amplifiers 222, 232 respectively amplify the signals output by sensors 220, 230. However, according to some embodiments, amplifiers 222, 232 may be omitted, and sensors 220, 230 may be directly connected to wireless transmission devices 240, 242.

Power device 250 provides power to components of sensor package 200. Details of power device 250 will be discussed in exemplary embodiments below. Although power device 250 is schematically shown within the interior of sensor package 200 in FIG. 2, power device 250 may instead be disposed on the outer surface of sensor package 200. Further, power device 250 may be connected to sensors 220, 230. Power device 250 may also be connected to amplifiers 222, 232. Power device 250 may supply a bias voltage to thermionic elements of sensors 220, 230, similar to voltage source 130 of the exemplary embodiment of FIG. 1.

To facilitate the thermionic emission utilized by components of sensor package 200, such as temperature sensor 220 and/or pressure sensor 230, housing 210 may be maintained under vacuum conditions, i.e., at a complete or partial vacuum. According to various embodiments, the interior of sensor package 200 may be maintained at a pressure of, for example, about 100 micro Torr or less, for a period of, for example, about 3000 hours of operation or more. Because sensor package 200 is self-contained, the vacuum conditions may be maintained without a vacuum connection between the interior of sensor package 200 and a vacuum source exterior to sensor package 200. Thus, sensor package 200 may operate without an external vacuum source.

As shown in FIG. 2, encasement 212 surrounds housing 210. Encasement 212 may be, for example, a hermetic package that facilitates sealing of housing 210 to substantially maintain vacuum conditions in the interior of sensor package 200. Sensor package 200 including housing 210 and encasement 212 may have a leak rate of less than about $10^{-8}$ cm$^3$ atm/sec, according to at least certain exemplary embodiments.

Encasement 212 may comprise, for example, a refractory material such as a refractory metal. The refractory metal may include, for example, titanium, platinum, palladium, tungsten, tantalum, alloys thereof, or other suitable refractory metals. According to some embodiments, the encasement 212 may include tungsten. Encasement 212 may be in the form of a single layer that surrounds housing 210. However, according to some embodiments, encasement 212 may include a plurality of layers. For example, encasement 212 may comprise a first layer, such as a layer of a refractory metal, and at least a second layer. The second layer of encasement 212 may comprise a coating upon the first layer, such as, for example, a metallic layer or a ceramic layer. Thus, an outermost layer of encasement 212 may form the outer surface of sensor package 200. When the second layer of encasement 212 is metallic, the second layer may include, for example, titanium, platinum, or alloys thereof. When the second layer of encasement 212 is metallic, the second layer may include, for example, zirconium oxide. Encasement 212 may include a plurality of the first and second layers, which are alternately stacked on one another.

Scavenging material 260 operates as a getter material, to sequester gaseous molecules that infiltrate the interior of housing 210. As such, scavenging material 260 helps maintain a vacuum or partial vacuum in housing 210. Although housing 210 may be substantially sealed, some diffusion or leaking of gaseous molecules into housing 210 may occur. Accordingly, scavenging material 260 may act as a getter material that reacts with gaseous molecules the infiltrate the interior of sensor package 200. Scavenging material 260 may be a material with a low vapor pressure and a high affinity for oxygen and/or other gaseous molecules at high temperature, such as, for example, zirconium.

In order to provide a thermoelectric element capable of sustained operation in an extreme environment, materials of the thermoelectric element should be carefully selected. For instance, materials may be subjected to extreme environments having, for instance, a high temperature, such as, for example, about 750° C. to about 1600° C., a high pressure, such as, for example, pressures up to about 1000 psi, and/or a gaseous environment including, such as, hydrocarbons, oxygen, water vapor, carbon dioxide, carbon monoxide, sulfur oxide, and/or nitrous oxide gases. The gaseous environment may have a flow rate of up to, for example, about 1500 mph.

A material may be selected for housing 210 of sensor package 200 that is capable of withstanding a surrounding environment under the extreme conditions noted above, for substantial periods of time. According to various embodiments, the housing 210 comprises a ceramic, such as, for example, alumina ($Al_2O_3$). Typical ceramics, such as alumina, contain a small amount of porosity, and thus, have a high temperature oxygen conductivity that is unsuitable for use as a vacuum barrier at high temperatures. To address this, housing 210 may comprise a ceramic, such as alumina, sintered from nano-sized particles, so that the resulting ceramic has substantially zero porosity. According to exemplary embodiments, the alumina with substantially zero porosity comprises substantially pure alumina, such as, for example, alumina with a purity of about 99.9% or higher. Further, alumina is very strong. For instance, alumina having a flexural strength of over 150 MPa at 1600° C. can withstand over 1600 psi of pressure for a 1 cm$^2$ roof structure of a housing having a thickness of 1.5 mm, which is well in excess of a desirable target, which may be, for example, about 1000 psi. In addition, alumina is advantageously resistant to many chemicals and gases, including, for example, oxygen, steam, hydrocarbons, carbon dioxide, carbon monoxide, $SO_x$, and $NO_x$.

Substantially non-porous alumina is available as Dynallox HP, 99.9% $Al_2O_3$ from Dynamic Ceramic of Cheshire, UK, and HIP Vitox, 99.9% $Al_2O_3$ from Morgan Technical Ceramics of Fairfield, N.J. Dynallox HP, 99.9% $Al_2O_3$ has a porosity of about 0%, an elasticity of approximately 350 GPa at room temperature and approximately 300 GPa at 1600° C., a maximum operating temperature of about 1800° C., a coefficient of thermal expansion of about 8.5 ppm/K, a flexural strength of approximately 350 MPa at room temperature and approximately 150 MPa at 1600° C., and is chemically compatible with carbon dioxide, oxygen, hydrocarbons, carbon monoxide, steam, $NO_x$, and $SO_x$ at 1600° C. HIP Vitox, 99.9% $Al_2O_3$ has a porosity of about 0%, an elasticity of approximately 407 GPa at room temperature and approximately 350 GPa at 1600° C., a maximum operating temperature of about 1750° C., a coefficient of thermal expansion of about 6.8 ppm/K, a flexural strength of approximately 550 MPa at room temperature and approximately 210 MPa at 1600° C., and is chemically compatible with carbon dioxide, oxygen, hydrocarbons, carbon monoxide, steam, $NO_x$ and $SO_x$ at 1600° C.

According to at least one exemplary embodiment, housing 210 may comprise a plurality of pieces joined together.

The pieces may be joined together via, for example, a paste of a compatible ceramic material, according to one exemplary embodiment. For instance, a paste in green form may be applied between pieces to be joined and then fired, such as in a high temperature co-fired ceramics (HTCC) process. The paste should be compatible with the materials that housing 210 is made of and should be capable of operating within an extreme environment for a substantial period of time without substantially compromising the vacuum capabilities of housing 210.

According to exemplary embodiments, the paste comprises alumina (i.e., is an alumina-based paste). For example, the paste may be Ceramabond 569 alumina base paste from Aremco of Valley Cottage, N.Y., which has a maximum operating temperature of 1650° C., a coefficient of thermal expansion of 7.6 ppm/K, and is compatible with at least alumina, tungsten, and molybdenum. In other exemplary embodiments, the paste may be Resbond® 903HP alumina base paste from Cotronics of Brooklyn, N.Y., which has a maximum operating temperature of 1780° C., a coefficient of thermal expansion of 4.0 ppm/K, and is compatible with at least alumina, tungsten, and molybdenum.

Materials for the cathode and anode of a thermionic element, such as the thermionic element 100, may be selected to withstand the conditions of an extreme environment. Further, the materials for the cathode and anode should be selected so the materials do not degrade at a high rate under the vacuum or partial vacuum within a sensor. The materials may also be selected to be substantially compatible with the material of the housing of a sensor. For instance, materials may be selected to have a similar coefficient of thermal expansion to the material of a housing, such as the ceramic and/or paste, at high temperature so the materials of the cathode and anode have minimal buckling and so popping off of the cathode or anode material from the housing material at high temperature is minimized or eliminated. Generally, the cathode material is electrically conductive and may be tied to ground or another voltage so that electrons can replenish those that have left the cathode.

A further consideration for materials of the cathode and anode is the work function of the materials. In various embodiments described herein, the cathode and anode are substantially at the same temperature. As a result, the cathode and anode materials should be selected so their work functions over a target operating range are sufficiently different to generate an adequate current density. For instance, thermionic emission is governed by Richardson's equation:

$$J=AT^2 e^{-Phi/kT}$$

where J=thermionic current density (A/m$^2$), A=thermionic constant dependent upon material properties, T=electrode temperature (K), phi=work function of the material, and k=Boltzmann constant.

According to various exemplary embodiments, a cathode may comprise tungsten and another material. Tungsten may be used as a base material for a cathode because tungsten can withstand the high temperatures a sensor is subjected to, does not degrade at a substantial rate over a substantial period of time in vacuum conditions, and has a coefficient of thermal expansion that is well matched with the materials of a sensor housing.

In general, the work function of the cathode material can be the same, lower, or higher than that of the anode material, depending on a thermionic behavior desired for the sensor.

According to various exemplary embodiments, a cathode may comprise a low-work-function material in addition to a metal material, such as tungsten. The metal of the cathode may be coated, mixed and/or impregnated with one or more low-work-function materials, for example chosen from thorium (Th), thorium oxide (ThO$_2$), barium (Ba), barium oxide (BaO), strontium (Sr), strontium oxide (SrO), calcium oxide (CaO), lanthanum (La), lanthanum oxide (La$_2$O$_3$), yttrium (Y), yttrium oxide (Y$_2$O$_3$), cesium (Ce), cesium oxide (CeO$_2$), and combinations thereof. Suitable coating/impregnating low-work-function materials include, for example, BaO, SrO, CaO, La, La$_2$O$_3$, and/or combinations thereof. In certain embodiments, the low-work-function material may not be electrically conductive, and RF sputtering may be employed.

A cathode may comprise tungsten including a rare earth element, such as, for example, lanthanum. The rare earth element may be present in an amount of about, for example, 0.2 weight percent or more, based on the total weight of the cathode. The rare earth element may form an alloy with tungsten, which may include one or more phases, or may be present in an oxide form, such as oxide particles dispersed in the tungsten. According to exemplary embodiments, a cathode may comprise lanthanated tungsten. An example of lanthanated tungsten is tungsten that includes lanthanum oxide (i.e., La$_2$O$_3$) in an amount of, for example, about 0.2 weight percent to about 5 weight percent, based on the total weight of the lanthanated tungsten. According to other exemplary embodiments, lanthanated tungsten includes lanthanum oxide in an amount of, for example, about 1 weight percent, based on the total weight of the lanthanated tungsten. Lanthanated tungsten may have a Richardson thermionic constant (A) of 6×10E$^5$ A/m$^2$, a work function (phi) of about 4.5 eV, a coefficient of thermal expansion of about 4.7 ppm/K at room temperature and about 5.8 ppm/K at 1600° C., an elastic modulus of about 200 GPa at room temperature and about 400 GPa at 1600° C., and a tensile strength of about 300 MPa at room temperature and about 1000 MPa at 1600° C.

According to various exemplary embodiments, an anode may comprise substantially pure tungsten. Substantially pure tungsten may have a purity of, for example, approximately 99.99%. In other words, an anode may be formed of high purity tungsten, such as approximately 99.99% pure tungsten, so as to avoid impurities and elements that would alter the properties of the pure tungsten, such as, for example, the work function and/or the coefficient of thermal expansion of tungsten. Substantially pure tungsten may have a Richardson thermionic constant (A) of 6×10E$^5$ A/m$^2$, a work function (phi) of about 2.5 to about 2.8 eV, a coefficient of thermal expansion of about 4.5 ppm/K at room temperature and about 5.5 ppm/K at 1600° C., an elastic modulus of about 200 GPa at room temperature and about 400 GPa at 1600° C., and a tensile strength of about 300 MPa at room temperature and about 1000 MPa at 1600° C. According to other exemplary embodiments, an anode may comprise platinated tungsten (i.e., tungsten including platinum and/or platinum oxide). For example, the anode may comprise from about 0.01 to about 10 wt % platinum, based on the total weight of the anode. According to another embodiment, an anode may be made of a different suitable material having a lower work function than a cathode material.

Figure 3:
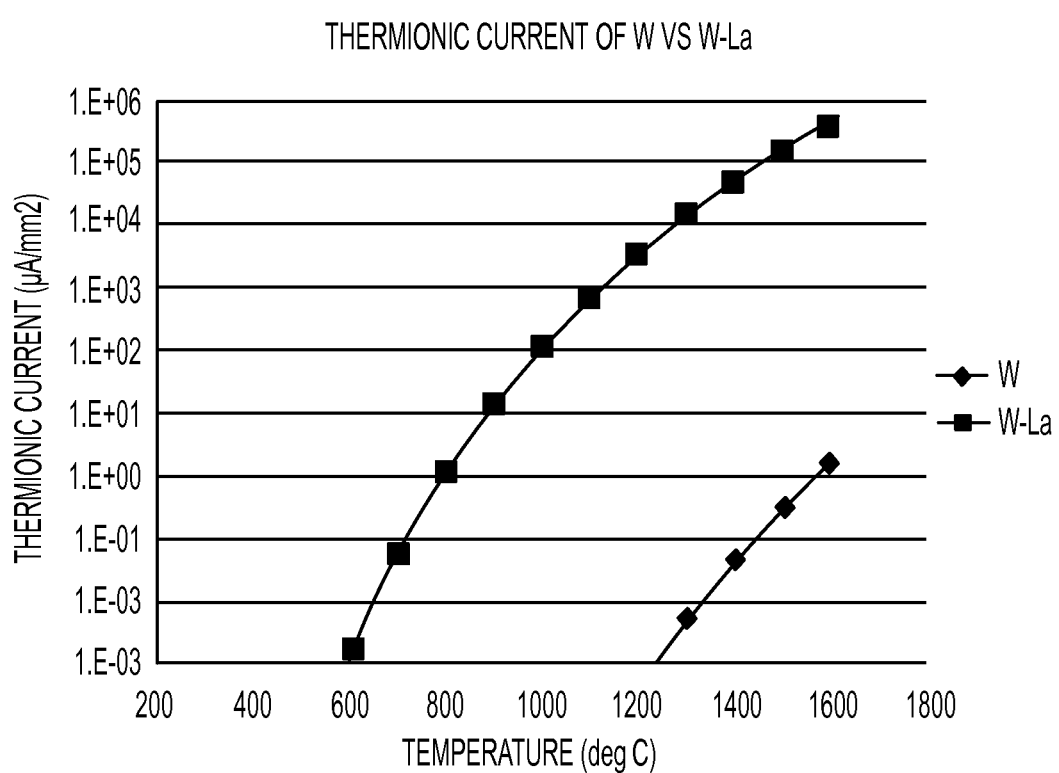
FIG. 3 shows a plot of thermionic performance of a cathode and anode pair, according to various embodiments of the present disclosure.

Cathode and anode materials may be paired by selecting materials from any of the previous exemplary embodiments described above. According to exemplary embodiments, a cathode may comprise lanthanated tungsten and an anode may comprise substantially pure tungsten according to the exemplary embodiments described above. FIG. 3 shows a plot of thermionic performance for a lanthanated tungsten cathode and a substantially pure tungsten anode, with thermionic current plotted over temperature. Due to their large difference in work functions, the lanthanated tungsten cathode has more than five orders of magnitude of activity than the substantially pure tungsten anode, as shown in FIG. 3, resulting in current densities well in excess of those required for a functional thermionic device. However, cathode and anode material pairings are not limited to lanthanated tungsten and substantially pure tungsten but the respective materials for a cathode and anode may be selected from any of the exemplary embodiments described above.

The materials of other components or parts of a sensor package may also be selected to withstand the conditions of an extreme environment. According to exemplary embodiments, bond pads for making an electrical connection to cathodes and/or anodes within a sensor package may comprise the same material as the cathode or anode. According to other exemplary embodiments, bond pads may be made of tungsten, whether or not a cathode or anode is made of tungsten.

Figure 4:
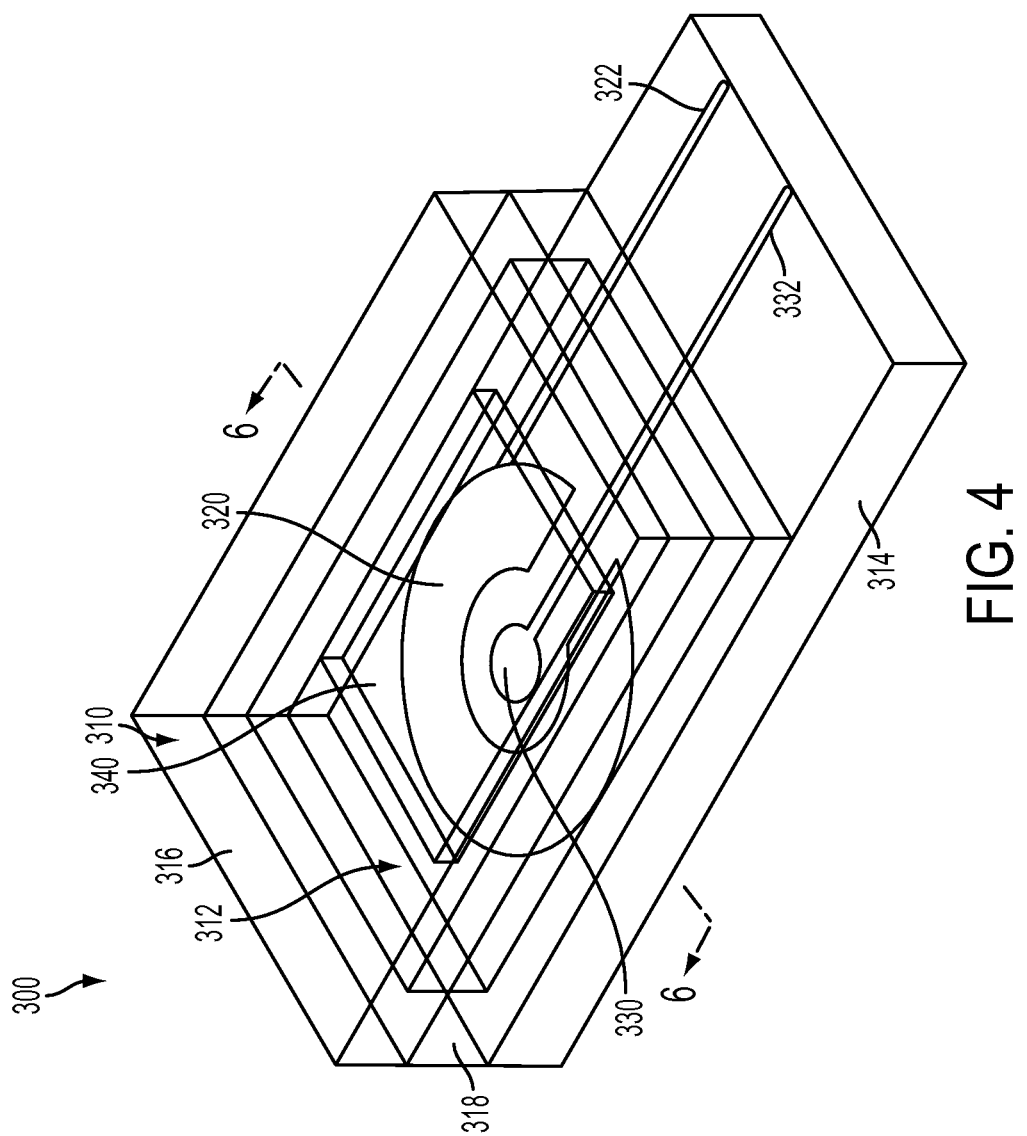
FIG. 4 shows a schematic perspective view of a thermionic temperature sensor, with internal components of the sensor revealed, according to various embodiments of the present disclosure.

FIG. 4 illustrates a thermionic temperature sensor 300, according to an exemplary embodiment of the present disclosure. Referring to FIG. 4, temperature sensor 300 includes a housing 310, an anode 320, and a cathode 330. Housing 310, anode 320, and cathode 330 may be made of any of the materials discussed in the exemplary embodiments above. Herein, housing 310 may be referred to as "a sensor housing." Housing 310 includes a top plate 316 and a bottom plate 318 that cooperate to form an emission chamber 312 in which anode 320 and cathode 330 are located. As discussed above with regard to the exemplary embodiment of FIG. 2, the emission chamber 312 of housing 310 may be maintained under vacuum conditions, such as at a pressure of, for example, about 100 micro Torr or less, to facilitate substantially unimpeded emission of electrons between cathode 330 and anode 320.

Temperature sensor 300 is shown in FIG. 4 as being a standalone temperature sensor. However, temperature sensor 300 may be included in a sensor package. For example, temperature sensor 300 may be utilized as temperature sensor 220 of sensor package 200 of FIG. 2, according to some embodiments.

Housing 310 may include other components, such as a spacer (not shown) between top plate 316 and bottom plate 318 to form chamber 312 in conjunction with top plate 316 and bottom plate 318, as will be discussed below. However, housing 310 is not limited to this configuration and may have other arrangements. For example, a recess may be formed in a surface of top plate 316, bottom plate 318, or in both top plate 316 and bottom plate 318, to form chamber 312. Housing 310 may further include a substrate 314 upon which bottom plate 318 and top plate 316 are disposed. However, according to some embodiments, substrate 314 may be omitted. When included in sensor package 200, substrate 214 may be used as substrate 314.

Anode 320 may, in exemplary embodiments, be "C" shaped. Cathode 330 may, in exemplary embodiments, be circular and may be disposed inside anode 320. In particular, opposing edges of cathode 330 and anode 320 may optionally be spaced apart by a substantially consistent minimum distance. In other words, a substantially consistent gap may be formed between anode 320 and cathode 330. Anode 320 and cathode 330 may be formed, for example, by depositing the materials of anode 320 and cathode 330 upon bottom plate 318, according to an exemplary embodiment. Temperature sensor 300 may further include leads 322 and 332 that respective extend from anode 320 and cathode 330 to the outside of housing 310. Lead 332 extends from cathode 330 though an opening in anode 320. A minimum distance between anode 320 and lead 332 may be substantially the same as the minimum distance between anode 320 and cathode 330.

Figure 5:
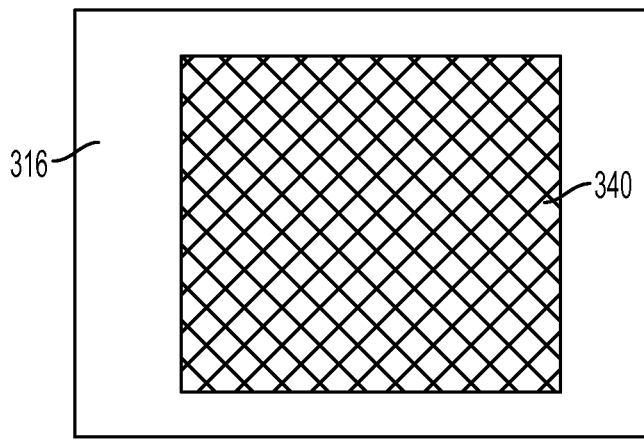
FIG. 5 shows a bottom view of the top plate and equipotential surface of the thermionic sensor of FIG. 4.
Figure 6:
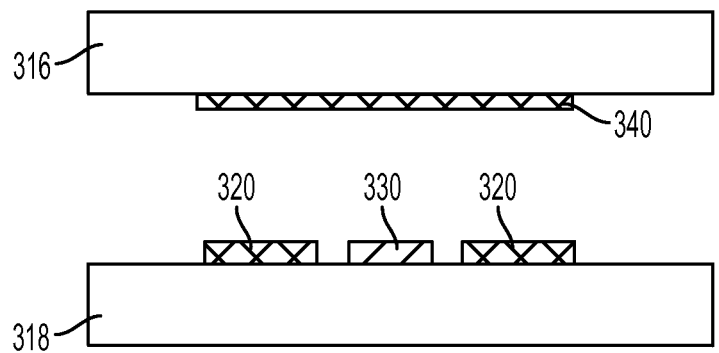
FIG. 6 shows a side view of the thermionic sensor of FIG. 4, taken along line 6-6 of FIG. 4.
Figure 7:
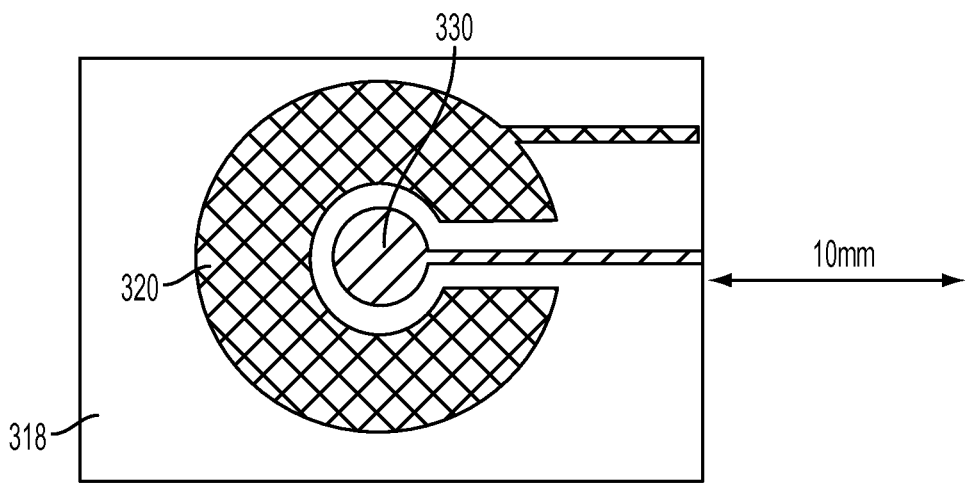
FIG. 7 shows a top view of the bottom plate, anode, and cathode of the thermionic sensor of FIG. 4.

FIG. 5 is a bottom view of top plate 316. FIG. 6 is a side view of temperature sensor 300, taken along line 6-6 in FIG. 4, where substrate 314 is omitted. FIG. 7 is a top view of bottom plate 318. Referring to FIGS. 4-7, temperature sensor 300 may further include an electrically conductive layer 340 disposed on top plate 316, within chamber 312. Layer 340 may be, for example, a layer of tungsten deposited on top plate 316. Layer 340 may be disposed on a bottom side of top plate 316, so that layer 340 faces anode 320 and cathode 330 disposed on bottom plate 318. According to exemplary embodiments, layer 340 may serve as a semi-passive ceiling (i.e., equipotential surface). For instance, a small bias voltage (e.g., about 5 V) may be provided between anode 320 and cathode 330, while the voltage of layer 340 is floated.

Figure 8:
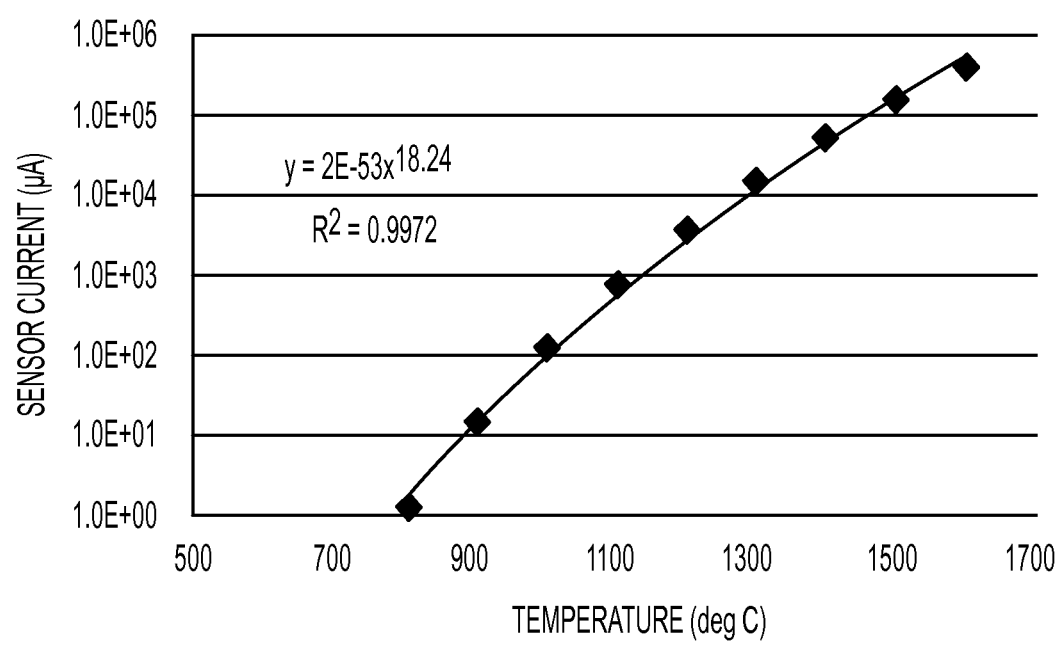
FIG. 8 shows a plot of temperature sensor performance, according to various embodiments of the present disclosure.

Because the rate of thermionic emission between cathode 330 and anode 320 is a direct function of the temperatures of cathode 330 and anode 320, a current signal obtained from anode 320 and cathode 330, such as via leads 322, 332, can be directly correlated to temperature. The inventors prepared a simulation of temperature sensor 300 to estimate its performance. With a cathode area of 10 mm$^2$ and an anode area of 20 mm$^2$, a cathode to anode bias voltage of 5 V, and a spacing between layer 340 and anode 320 and cathode 330 of 5 mm, a calculated response of temperature sensor 300 was determined, which is shown in FIG. 8. The response follows a power law, which may be used to calibrate temperature sensor 300. It is expected that temperature sensor 300 has a resolution of about 10° C. (about 1%) in an environment at 1000° C. and a resolution of less than about 1° C. (about 0.06%) in an environment at 1600° C.

Figure 9:
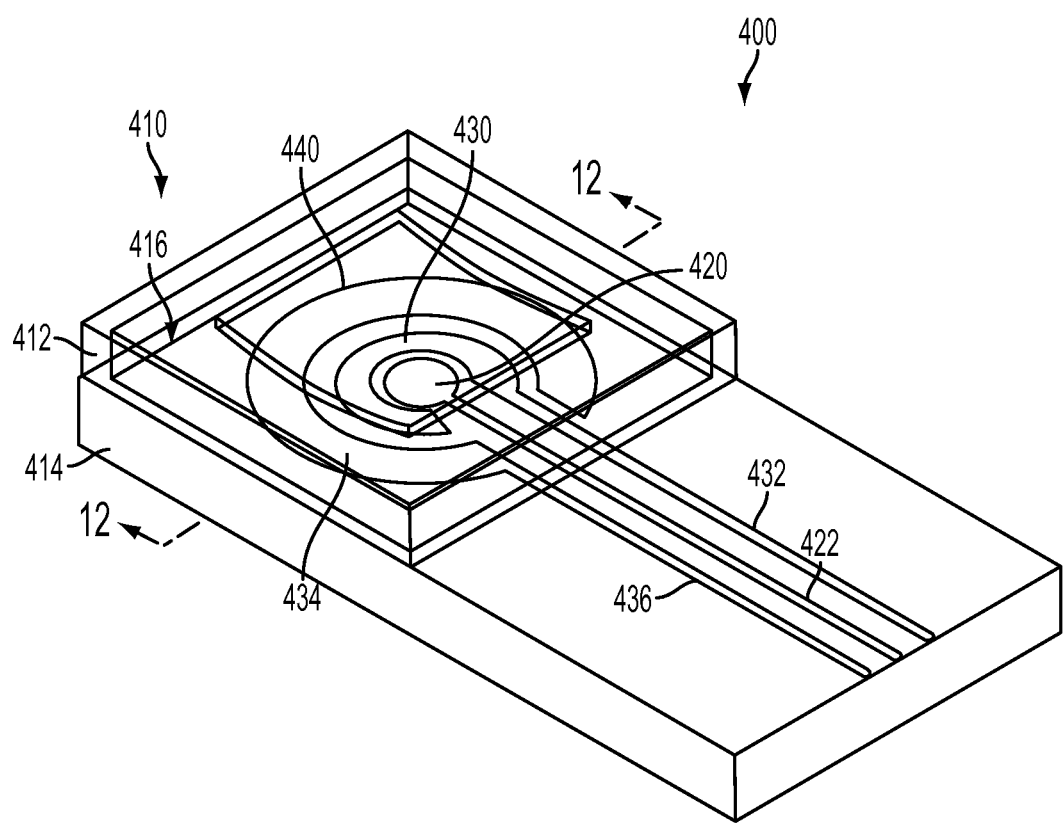
FIG. 9 shows a schematic perspective view of a thermionic pressure sensor, with internal components of the sensor revealed, according to various embodiments of the present disclosure.

FIG. 9 illustrates a thermionic pressure sensor 400, according to various embodiments of the present disclosure. Referring to FIG. 9, pressure sensor 400 include a housing 410, which may include a top plate 412 and a substrate 414 that cooperate to form an emission chamber 416 in which a cathode 420, an inner anode 430, and an outer anode 434 are disposed. Herein, housing 410 may be referred to as "a sensor housing." Cathode 420, inner anode 430, and outer anode 434 may be made with any of the materials of the exemplary embodiments discussed above, and may be formed by, for example, depositing such materials upon substrate 414.

Cathode 420 may, for example, be substantially circular. Inner and outer anodes 430 and 434 may, for example, be "C" shaped. Outer anode 434 may optionally be wider than inner anode 430. Opposing edges of cathode 420 and inner anode 430 may optionally be spaced apart by a substantially consistent first minimum distance. Opposing edges of inner anode 430 and outer anode 434 may optionally be spaced apart by a substantially consistent second minimum distance. The first and second minimum distances may be substantially the same.

As discussed above with regard to the exemplary embodiment of FIG. 2, the emission chamber 416 of housing 410 may be maintained under vacuum conditions, such as at a pressure of, for example, about 100 micro Torr or less, to facilitate substantially unimpeded emission of electrons.

Pressure sensor 400 may be incorporated into a sensor package, such as sensor package 200. In order to determine the pressure outside of sensor package 200, housing 410 may be part of housing 210 of FIG. 2, such that housing 410 and housing 210 form different portions of single housing. Other configurations are possible, so long as at least a portion of housing 410 is exposed to ambient environmental pressure. In addition, substrate 414 may be substituted with substrate 214.

Housing 410 is shown schematically in FIG. 9 and may include other components, such as a spacer (not shown) disposed between top plate 412 and substrate 414 and at least partially forming chamber 416. However, housing 410 is not limited to this configuration and may have other arrangements, such as by providing a recess in top plate 412, substrate 414, or in each of top plate 412 and substrate 414, to form chamber 416. Further, although substrate 414 may be larger than top plate 412, as indicated in the exemplary embodiment of FIG. 9, substrate 414 may be substantially the same size as top plate 412.

Figure 10:
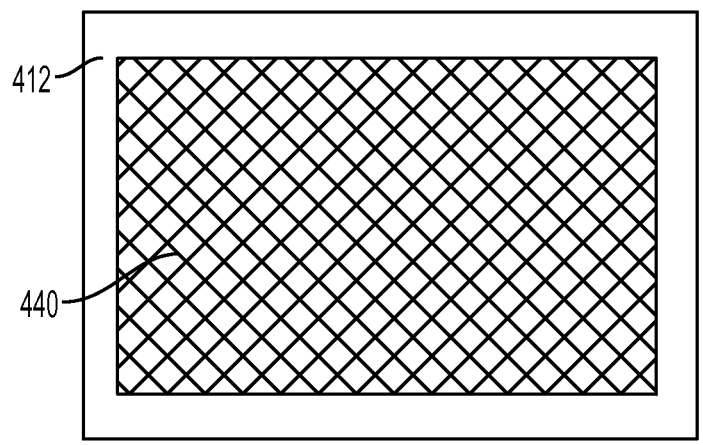
FIG. 10 is a bottom view of a top plate of a pressure sensor, according to various embodiments of the present disclosure.
Figure 11:
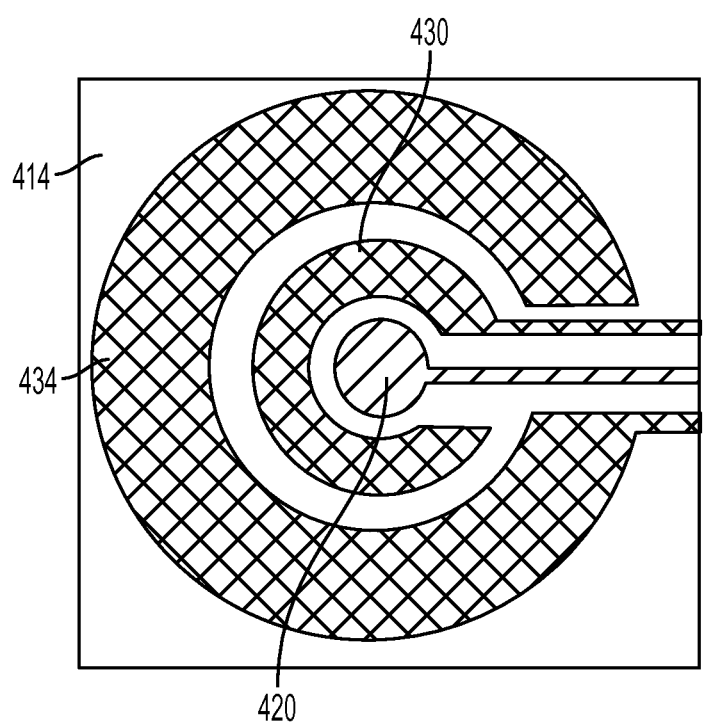
FIG. 11 is a top view of a substrate of a pressure sensor, according various embodiments of the present disclosure.
Figure 12:
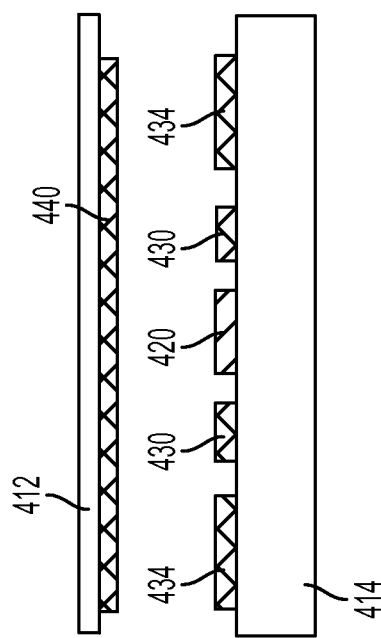
FIG. 12 is a side cross-sectional view taken along line 12-12 of FIG. 9.

Pressure sensor 400 may further include an electrically conductive layer 440 disposed on top plate 412, within chamber 416. Layer 340 may be, for example, a layer of tungsten deposited on top plate 412, as shown in FIG. 10, which is a bottom view of top plate 412 with layer 440. FIG. 11 shows a top view of substrate 414, which may have cathode 420, inner anode 430, and outer anode 434 disposed thereon. As shown in FIG. 12, which is a side view of temperature sensor 400 taken along line 12-12 of FIG. 9, layer 440 may be located on a bottom side of top plate 412, so that layer 440 faces cathode 420, inner anode 430, and outer anode 434.

Layer 440 may serve as a semi-passive ceiling (i.e., equipotential surface). For instance, a small separate bias voltage (e.g., about 5 V) may be provided between cathode 420 and inner anode 430 and between cathode 420 and outer anode 434, while the voltage of layer 440 is floated. A split anode configuration (i.e., inner anode 430 and outer anode 434) may be provided, for instance, so that the separate anodes receive equal current at any operating temperature.

Figure 13:
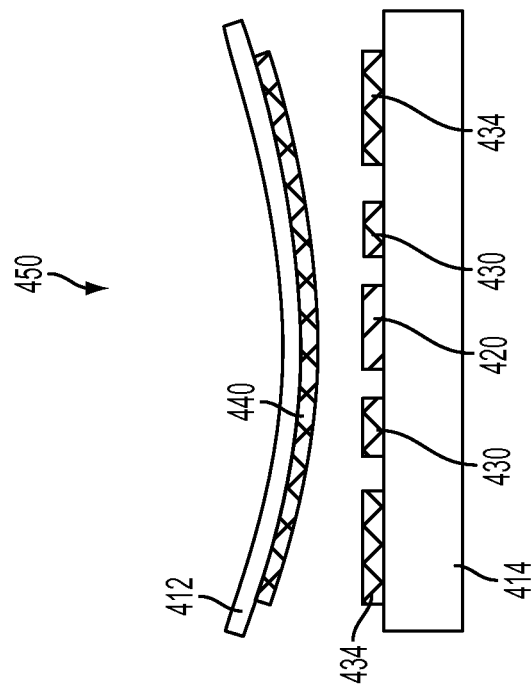
FIG. 13 shows the pressure sensor of FIG. 12 when an external pressure is applied to the sensor.

According to various exemplary embodiments, at least one surface of housing 410 is configured to flex when subjected to an external pressure from the ambient environment. A portion of housing 410 may be configured, for example, to flex under a pressure of up to about 1600 psi, while maintaining a vacuum or partial vacuum within chamber 416. According to various non-limiting and exemplary embodiments, only one surface of housing 410 may be configured to flex when subjected to an external pressure while the remaining surfaces of housing 410 do not flex. In other words, housing 410 may include a flexible portion and an inflexible portion. A flexible portion of housing 410 may be, for example, a portion that layer 440 is attached to, such as top plate 412, according to one exemplary embodiment. This is shown in the exemplary embodiment of FIG. 13, which shows the view of FIG. 12, but with an external pressure 450 applied to top plate 412, which is configured to flex under pressure 450, resulting in top plate 412 flexing and bending towards substrate 414. When top plate 412 flexes in this way, the relative distances between top plate 412 and anodes 430, 434, and cathode 420 are changed. As the relative distances change, the current detected to each anode 430, 434, such as via respective leads 432, 436, also changes. This change in current can be correlated to the external pressure 450 that causes flexion of top plate 412.

Figure 14:
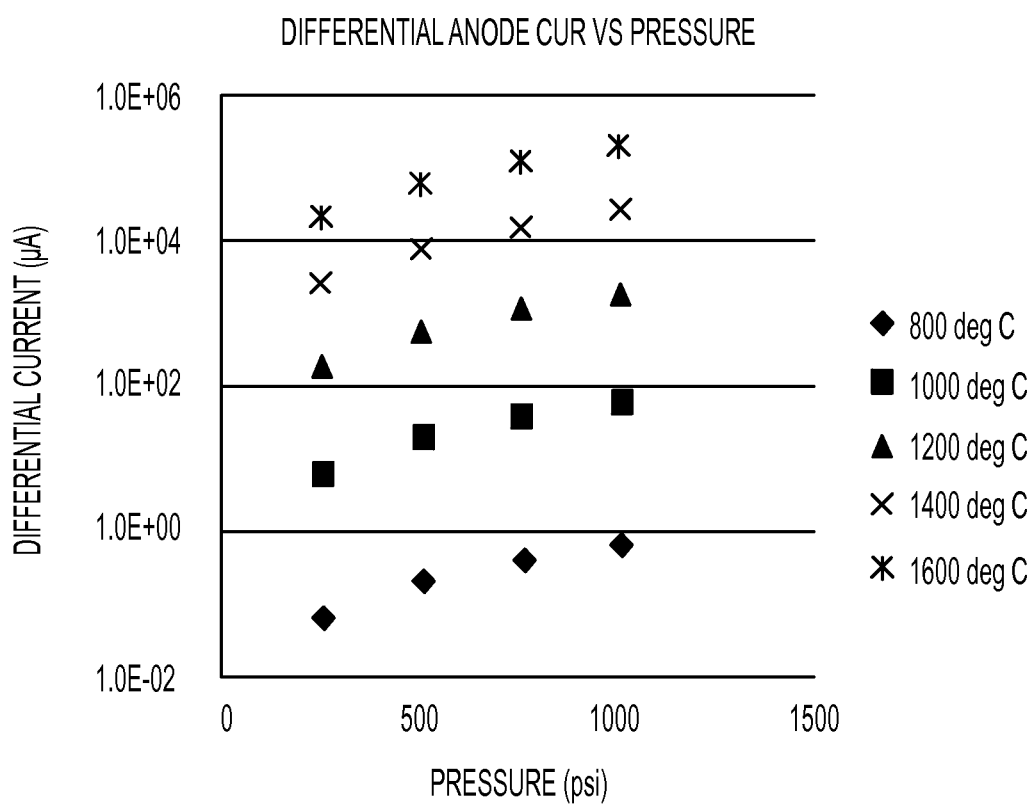
FIG. 14 shows a plot of pressure sensor performance, according to various embodiments of the present disclosure.

A simulation of pressure sensor 400 was prepared in order to estimate its performance. With a cathode area of 10 mm$^2$, an inner anode area of 20 mm$^2$, an outer anode area of 100 mm$^2$, a cathode to anode bias voltage of 5 V, and a spacing between layer 440 and cathode, 420, inner anode 430, and outer anode 434 of 5 mm, and a top plate 412 thickness of 0.2 mm, a calculated performance of the pressure sensor was plotted, which is shown in the exemplary embodiment of FIG. 14. The estimated pressure resolution of the pressure sensor is about 20 to about 70 psi (about 2% to about 7% of its full scale).

Because the overall rate of thermionic emission between the cathode and anodes is a function of temperature, the pressure sensor response is also dependent upon temperature. According to exemplary embodiments, pressure sensor 400 may be used in conjunction with temperature sensor 300, to measure the change in temperature and correlate the temperature to a true ambient pressure. For example, pressure sensor 400 may be provided as a pressure sensor 230 along with a temperature sensor 220, as shown in the exemplary embodiment of FIG. 2. According to exemplary embodiments, additional components, such as an amplifier 232, and/or an amplifier 222 for temperature sensor 220 may be included as well.

Other types of thermionic sensors may be provided by using other configurations of thermionic elements. According to exemplary embodiments, an array of temperature sensors, which may be each configured according to temperature sensor 300, may be arranged at known locations to detect a heat flux. The array may be arranged at known locations to measure heat flux in various coordinate arrangements, such as, for example, spherical coordinates, cylindrical coordinates, or other coordinate systems in which the sensors may be arranged. According to various exemplary embodiments, two or more pressure sensors 400 may be arranged in conjunction with temperature sensors 300, so as to measure a flow rate.

Figure 15:
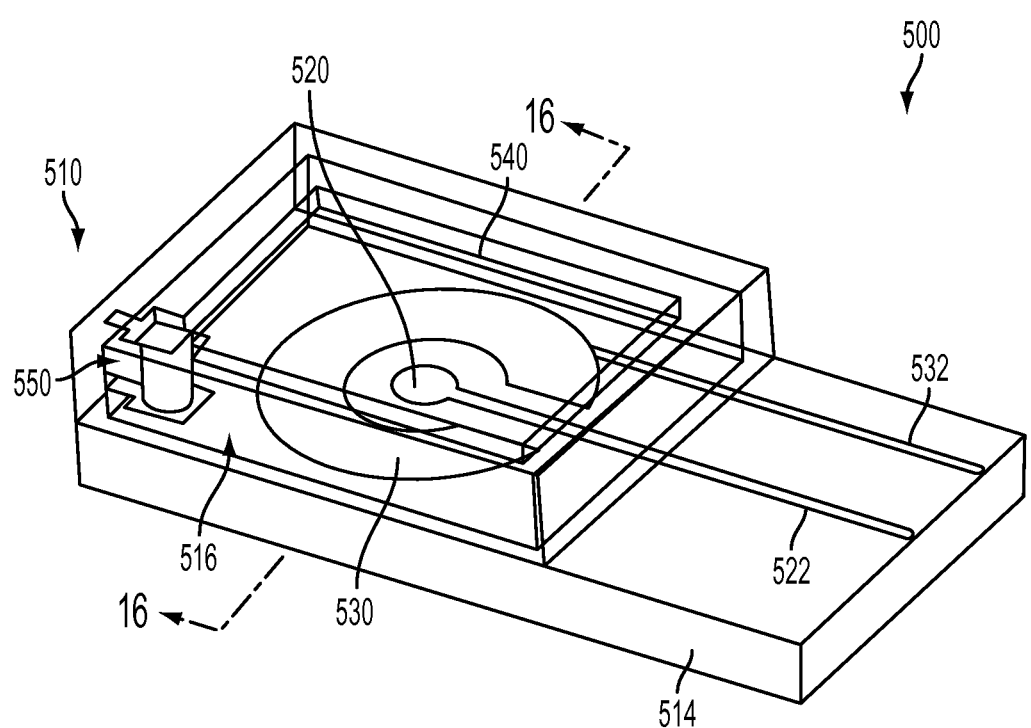
FIG. 15 shows a schematic perspective view of an amplifier, with internal components of the amplifier revealed, according to various embodiments of the present disclosure.

FIG. 15 illustrates an amplifier 500, according to various embodiments of the present disclosure. Referring to FIG. 15, amplifier 500 may be used with the temperature sensor of the exemplary embodiments of FIGS. 4-8 and/or the pressure sensor of the exemplary embodiments of FIGS. 9-14. For instance, amplifier 500 may be provided in sensor package 200 as amplifier 222 or amplifier 232, to enhance the output signal of a temperature sensor 220 and/or a pressure sensor 230.

Amplifier 500 includes a housing 510 disposed on a substrate 514. The housing 510 at least partially defines an interior chamber 516 in which a cathode 520 and an anode 530 are disposed. As discussed above with regard to the exemplary embodiment of FIG. 2, the interior chamber 516 may be maintained under a vacuum or partial vacuum, such as at a pressure of, for example, about 100 micro Torr or less. Substrate 514 may be substrate 214, when amplifier 500 is included in sensor package 200. Leads 522, 532 may respectively be connected to cathode 520 and anode 530, to serve as input/output conduits.

Figure 16:
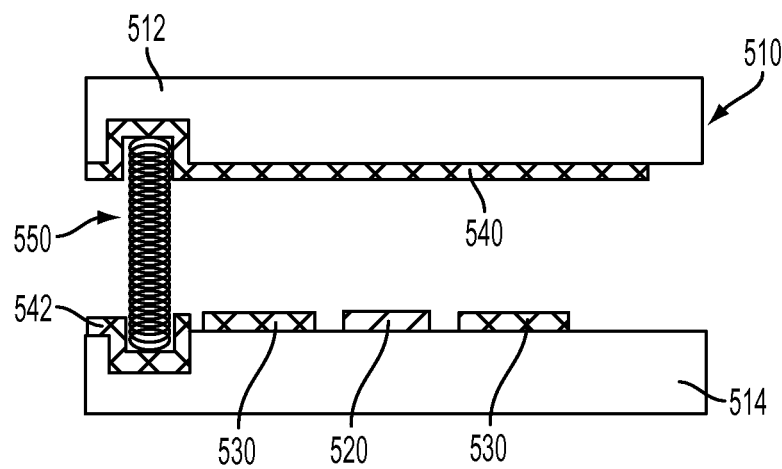
FIG. 16 is a side cross-sectional view taken along line 16-16 of FIG. 15.
Figure 17:
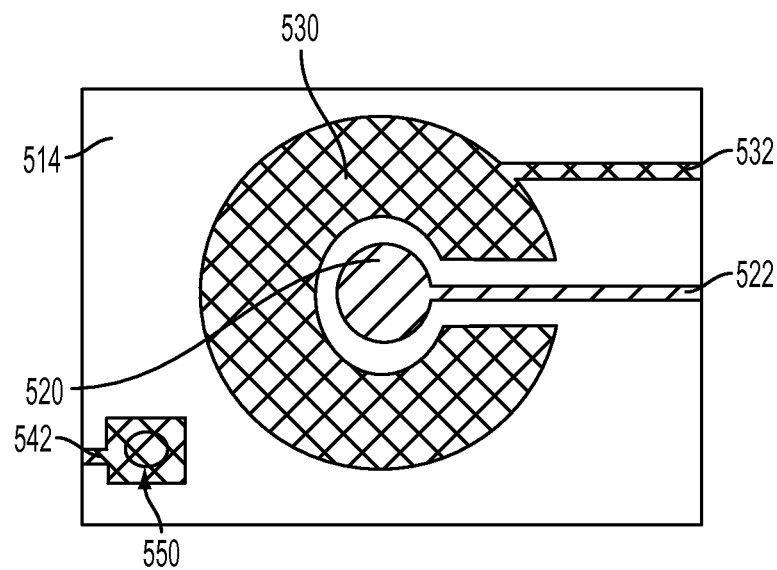
FIG. 17 is a top view of a substrate of the pressure sensor of FIG. 15.

FIG. 16 is a sectional view taken along line 16-16 of FIG. 15. Referring to FIGS. 15 and 16, housing 510 may include a top plate 512 upon which an electrically conductive layer 540 is disposed within chamber 516. However, according to some embodiments, chamber 516 may be formed entirely within housing 510, and substrate 514 may be omitted. For example, housing 510 may include a top plate and a bottom plate as shown in FIG. 4. Layer 540 may be, for example, a layer of tungsten deposited on top plate 512, according to exemplary embodiments. FIG. 17 shows a top view of substrate 514, on which cathode 520 and anode 530 are disposed. As shown in FIG. 16, layer 540 may be disposed on a bottom side of top plate 512, so that layer 540 faces cathode 520 and anode 530.

In contrast to the sensor embodiments of FIGS. 4-14, layer 540 of amplifier 500 is electrically active in the exemplary embodiment of FIG. 15. A control voltage may be applied to layer 540, which in turn changes the potential of layer 540 and changes the flow of current between cathode 520 and anode 530. To supply the control voltage to layer 540, an electrical connection 550 may be provided. As shown in FIGS. 15 and 16, electrical connection 550 may extend from substrate 514 to top plate 512. A contact 542 may be provided on substrate 514, to supply the voltage to electrical connection 550, as shown in FIGS. 16 and 17. According to exemplary embodiments, electrical connection 550 may, for example, be a spring, as shown in FIG. 16, to accommodate any relative movement between top plate 512 and substrate 514.

Figure 18:
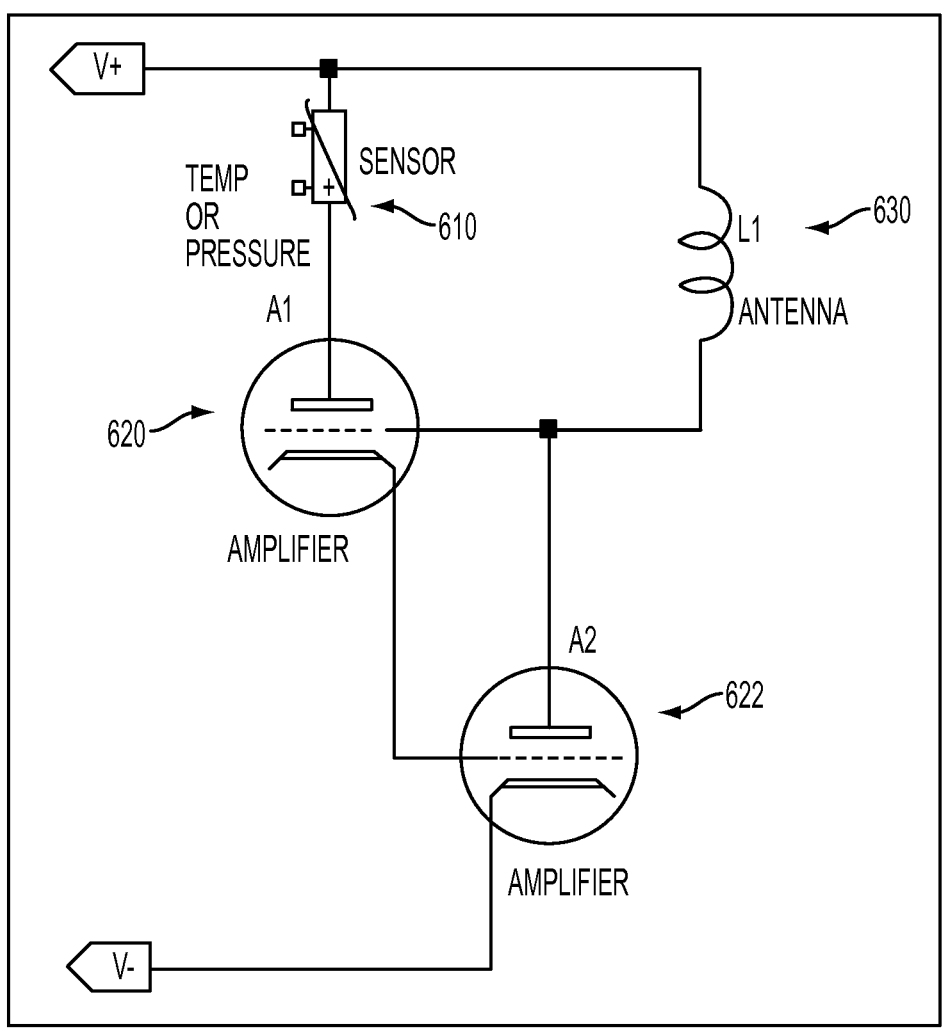
FIG. 18 is a schematic view of a wireless transmission device according to various embodiments of the present disclosure.

As discussed above with regard to the exemplary embodiment of FIG. 2, a wireless transmission device may be provided to wirelessly transmit data to a device external to a sensor according to various embodiments of the disclosure. For example, FIG. 18 is a schematic diagram of a wireless transmission device 600, according to various embodiments. Referring to FIG. 18, wireless transmission device 600 operates as a thermionic oscillator, such as a resistor-inductor (RL) relaxation oscillator.

As shown in the exemplary embodiment of FIG. 18, wireless transmission device 600 may be connected to a sensor 610, such as the temperature sensor of the exemplary embodiment of FIG. 4 and/or the pressure sensor of the exemplary embodiment of FIG. 9, a resistor, which may be fabricated as a film of tungsten or platinum on the same substrate as the electrodes, first and second amplifiers 620, 622, and an antenna 630. Amplifiers 620, 622 may be configured according to the exemplary embodiment of FIGS. 15-17. Thus, wireless transmission device 600 may include a thermionic element.

The frequency of the wireless transmission device 600 may be driven by the magnitude of the signal from sensor 610 (i.e., a voltage to frequency conversion), with the signal being wirelessly transmitted wireless transmission device 600 via antenna 630. The signal may in turn be converted by a device external to a sensor that receives the signal. Such an external receiving device may also be external to the extreme environment so that the external device need not be designed to withstand the extreme environment.

Figure 19:
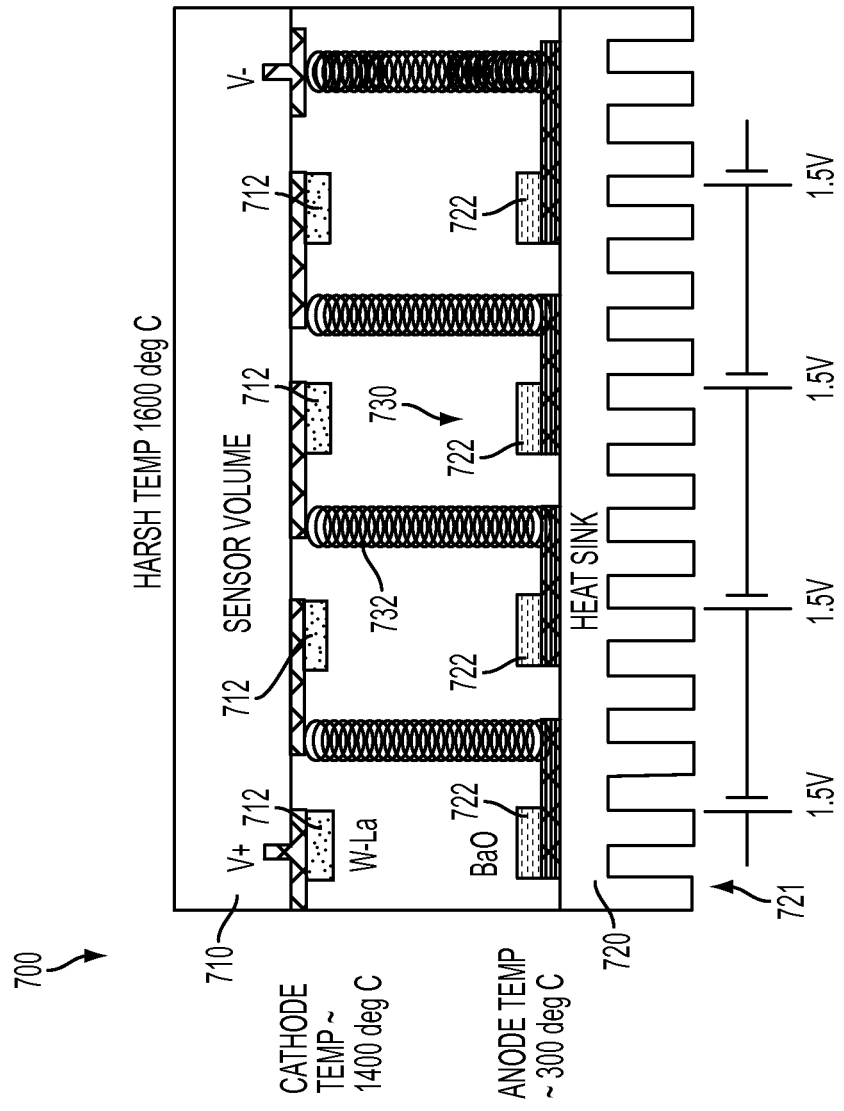
FIG. 19 is a side cross-sectional view of a power device, according to various embodiments of the present disclosure.

FIG. 19 illustrates a section view of a thermionic power device 700, according to various embodiments of the present disclosure. Referring to FIG. 19, power device 700 is a specific example of power device 250 that is included in the sensor package 200 of FIG. 2. Power device 700 is a thermionic power generator that includes a first substrate 710 and an opposing second substrate 720. Thermionic power device 700 may be at least partially disposed within a sensor package, or may be disposed on an external surface of a sensor package. When power device 700 is disposed inside a sensor package, first substrate 710 may be at least a portion of a housing of the sensor package that is exposed to an extreme environment, such as a high temperature environment. When power device 700 is disposed on an external surface of a sensor package, second substrate 720 may be, for example, a wall that serves as a boundary to the extreme environment, such as a wall of a room or vessel that contains the extreme environment and to which a sensor package including power device 700 is attached.

Accordingly, first substrate 710 may be disposed closer to a harsh temperature environment than the second substrate 720. As such, first substrate 710 may have a higher temperature than second substrate 720. For example, when first substrate 710 is at a temperature of, for example, about 1600° C., second substrate 720 may be at a temperature of, for example, about 300° C. Such a temperature difference provides a thermal gradient and facilitates power generation. According to various embodiments, second substrate 720 may by a heat sink including fins 721 to facilitate heat transfer and thereby facilitate the thermal gradient.

Power device 700 includes a cathode 712 and an anode 722, so that thermionic emission of electrons 730 may occur between cathode 712 and anode 722. Cathode 712 may comprise, for example, lanthanated tungsten or other exemplary cathode materials discussed above. Anode 722 may comprise, for example, barium oxide or other anode materials discussed above. Power device 700 may include multiple cathode 712 and anode 722 pairs. Each cathode 712 and anode 722 pair may be capable of generating approximately 1.5 V, with a potential for up to 5 A/cm$^2$ of current. To achieve a higher voltage and power output, cathodes 712 and anodes 722 pairs may be arranged in series, with a conductor 732 providing a connection between cathodes 712 and anodes 722. Thermionic emission of electrons 730 provides another connection between cathode 712 and anode 722 pairs. Conductor 732 may be a spring to accommodate any change in position between first substrate 710 and second substrate 720, such as due to thermal expansion. According to exemplary embodiments, power device 700 may have an efficiency of about 15%, or more, and power density of about 10 W/cm$^2$.

Figure 20:
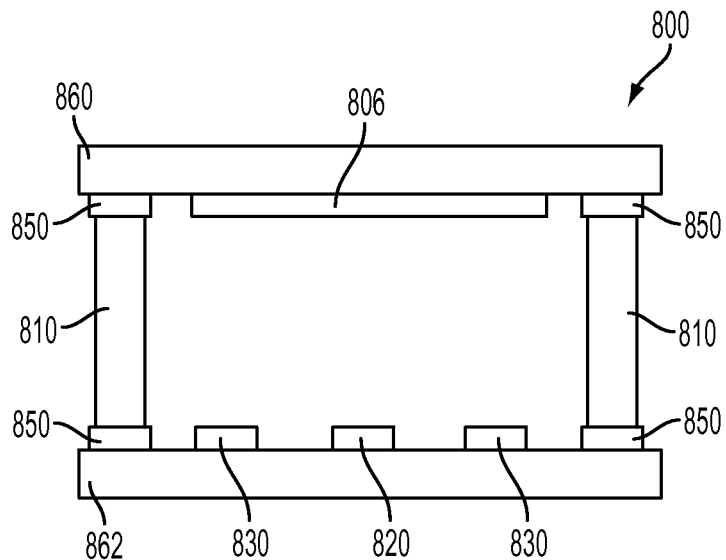
FIG. 20 is a side cross-sectional view of a thermionic sensor, according to various embodiments of the present disclosure.

FIG. 20 illustrates sectional view of a thermionic sensor 800, according to various embodiments of the present disclosure. Referring to FIG. 20, sensor 800 includes a substrate 862, a cathode 820 and an anode 830 disposed on substrate 862, a top plate 860 facing substrate 862, a conductive layer 806 disposed on top plate 860, and a spacer 810 disposed between substrate 862 and top plate 860. Spacer 810 may be connected to substrate 862 and top plate 860 using a sealing paste 850. Spacer 810 may be circular, but the present disclosure is not limited to any particular shape.

Substrate 862, top plate 860, and spacer 810 may be made of any of the materials discussed above for a sensor housing, such as, for example, alumina having substantially zero porosity. Sealing paste 850 may be a compatible paste and used in an HTCC process, as discussed above with regard to the exemplary embodiment of FIG. 2. A chamber formed between substrate 862, top plate 860, and spacer 810 may be at least partially evacuated and sealed. An encasement (not shown) may be applied to the exterior of top plate 860, spacer 810, and bottom plate 862 to facilitate the sealing.

An additional advantage of the exemplary embodiments of the thermionic sensors described herein is their compact size, although it should be noted that compact size is not required according to embodiments of the disclosure. Conventional sensors used in extreme environments are typically bulky, often because they are design to protect the sensor and mitigate the effects of the surrounding environment upon sensor components. However, the thermionic sensors according to at least certain exemplary embodiments described herein use the surrounding environment and therefore may have a more compact size. The surface area on an upper surface of a top plate of a sensor housing (i.e., top plate 316 of the exemplary embodiment of FIG. 4 or top plate 412 of the exemplary embodiment of FIG. 9) may be, for example, about 0.5 cm² to about 1.5 cm². For example, such sensor housings may have lengths and widths ranging from about 0.7 cm to about 1.25 cm.

Figure 21:
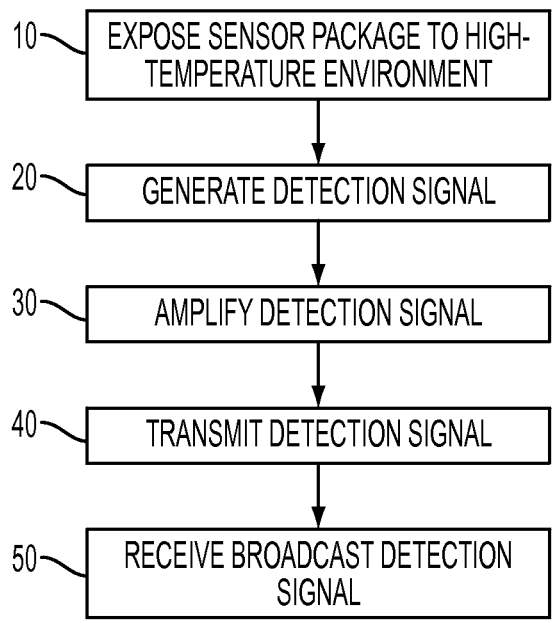
FIG. 21 is a block diagram illustrating a method of using a sensor package, according to various embodiments of the present disclosure.

FIG. 21 is a block diagram illustrating a method of using a sensor package, according to various embodiments of the present disclosure. Referring to FIG. 21, in a first operation 10, a sensor package is exposed to a high-temperature environment. In particular, at least a portion of the sensor package is exposed to temperatures of at least 500° C., for example, temperatures of at least 600° C. According to some embodiments the sensor package may be exposed to temperatures ranging from about 750° C. to about 1600° C. Further, the sensor package may be exposed to a high pressure, such as pressures up to about 1000 psi. As a result, the cathode and the anode a sensor of the sensor package are both heated to a temperature sufficient for thermionic emission to occur.

In addition, operation 10 may also include heating a cathode of a power generator of the sensor package to a relatively high temperature, while an anode of the power generator is kept at a relatively low temperature. For example, the cathode could be heated to a temperature that is from about 700° C. to 1200° C. higher than the temperature of anode. However, the present disclosure is not limited to any particular temperature variation. As a result, the power generator would generate sufficient current to power the sensor package. Therefore, the sensor package can be completely self-contained.

In operation 20, once the sensor package is sufficiently heated, the sensor generates a sensor signal via thermionic emission. In operation 30, the sensor signal may optionally be transmitted to an amplifier to amplify the sensor signal. However, according to some embodiments operation 30 may be omitted.

In operation 40, the sensor signal is transmitted to a wireless transmission device, which transmits the signal to an external device. For example, the sensor signal could be converted into a radio frequency (RF) signal, and then broadcast using an antenna of the sensor package to an external device configured to receive the RF signal.

In operation 50, the broadcast signal is received by an external device. The external device may extract sensor data from the received signal and store the same in a memory device. The sensor data may be stored with time and date information. The sensor date may include temperature data, pressure data, or any other data detected by a sensor of the sensor package. Operations 20-50 may be repeated, such that the conditions of the ambient environment of the sensor package may be tracked over time. For example, operations 20-50 may be repeated constantly, or may be repeated at a selected time interval.

In addition, data from multiple sensors may be transmitted concurrently. For example, data from multiple pressure and temperature sensors could be broadcast to an external device, such that a flow rate of an ambient environment of the sensor package could be determined.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, this description's terminology is not intended to limit the invention. For example, spatially relative terms—such as "beneath", "below", "lower", "above", "upper", "proximal", "distal", and the like—may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly.

This description and the accompanying drawings that illustrate exemplary embodiments should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Effort has been made to ensure that like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

It is to be understood that the particular examples and embodiments set forth herein are non-limiting, and modifications to structure, dimensions, materials, and methodologies may be made without departing from the scope of the present teachings.

Other embodiments in accordance with the present disclosure will be apparent to those skilled in the art from consideration of the specification and practice of the invention disclosed herein. It is intended that the specification and examples be considered as exemplary only, with a true scope and spirit being indicated by the following claims.

What is claimed is:

1. A thermionic sensor comprising:
    a sensor housing at least partially defining an emission chamber in which vacuum conditions are maintained, the emission chamber having opposing first and second surfaces;
    a cathode disposed in the emission chamber on the first surface;
    an anode disposed in the emission chamber on the first surface, and spaced apart from the cathode; and
    an electrically conductive layer disposed in the emission chamber on the second surface, facing the anode and cathode,
    wherein the thermionic sensor is configured to output a detection signal when the anode and cathode are at substantially the same temperature.

2. The thermionic sensor of claim 1, wherein the sensor housing comprises a substantially non-porous ceramic material.

3. The thermionic sensor of claim 1, wherein the emission chamber is maintained at a pressure of less than about 100 micro Torr.

4. The thermionic sensor of claim 1, wherein the cathode comprises tungsten alloyed with about 0.2% to about 5.0 wt % of a rare earth element, based on the total weight of the cathode.

5. The thermionic sensor of claim 4, wherein the rare earth element comprises lanthanum.

6. The thermionic sensor of claim 1, wherein the anode comprises substantially pure tungsten.

7. The thermionic sensor of claim 1, wherein:
    the sensor housing comprises a flexible portion configured to flex in response to an amount of ambient pressure applied to the sensor housing; and
    the electrically conductive layer is attached to the flexible portion, such that a distance between the electrically conductive layer and the cathode and anode changes in accordance with the amount of ambient pressure.

8. The thermionic sensor of claim 1, further comprising a refractory metal encasing the sensor housing.

9. The thermionic sensor of claim 1, wherein the sensor is configured to detect the temperature or pressure of an ambient environment.

10. The thermionic sensor of claim 1, wherein the anode comprises:
    an outer anode disposed around the cathode; and
    an inner anode disposed between the outer anode and the cathode, the inner and outer anodes being spaced apart from one another.

11. The thermionic sensor of claim 1, wherein the sensor housing comprises:
    a bottom plate upon which the cathode and the anode are disposed; and
    a top plate disposed on the bottom plate and upon which the conductive layer is disposed.

12. The thermionic sensor of claim 11, further comprising a spacer disposed between the top plate and the bottom plate.

13. The thermionic sensor of claim 11, further comprising a substrate on which the sensor housing is disposed, the substrate comprising the substantially non-porous ceramic material.

14. The thermionic sensor of claim 11, further comprising leads extending from the cathode and the anode to outside of the sensor housing.

15. The thermionic sensor of claim 1, wherein:
    one of the cathode and the anode is circular; and
    the other of the cathode and the anode is C-shaped.

16. The thermionic sensor of claim 1, wherein the cathode and the anode are spaced apart by a substantially constant minimum distance.

17. The thermionic sensor of claim 1, further comprising a substrate, wherein,
    the substrate and the housing cooperate to define the emission chamber, and
    the anode and the cathode are disposed on the substrate.

18. A thermionic sensor comprising:
    a sensor housing comprising a substantially non-porous ceramic material and at least partially defining an emission chamber that is maintained at a pressure of less than about 100 micro Torr;
    a cathode disposed in the emission chamber;
    an anode disposed in the emission chamber and spaced apart from the cathode; and
    an electrically conductive layer disposed in the emission chamber facing the anode and cathode,
    wherein the thermionic sensor is configured to:
        apply a bias voltage between the cathode and anode; and
        electrically float the conductive layer.

19. The thermionic sensor of claim 18, wherein the thermionic sensor is configured to output a detection signal when the anode and cathode are at substantially the same temperature.

* * * * *